Patented July 6, 1948

2,444,790

UNITED STATES PATENT OFFICE 2,444,790

TERPENE ISOMERIZATION

Alfred L. Rummelsburg, Wilmington, Del., assignor to Hercules Powder Company, Wilmington, Del., a corporation of Delaware No Drawing. Application May 13, 1941,
Serial No. 393,241

10 Claims. (Cl. 260—677)

This invention relates to the production of acyclic terpenes having three double bonds per molecule by the pyrolysis of pinene. More particularly, it relates to the production of acyclic terpenes by the pyrolysis of pinene whereby all the products resulting from the conversion have commercial utility.

Various methods have been suggested in the past for the preparation of acyclic terpenes. For example, when ocimene is boiled for several hours in a neutral atmosphere, it undergoes isomerization and is converted into allo-ocimene, see Simonsen vol. I, page 14. It has also been proposed to produce the material by the isomerization of α-pinene using reduced copper, copper chromite, or cobalt-thorium catalyst. With the use of these materials, however, only very small yields of allo-ocimene have been obtained. In fact, the literature on the subject indicates that the isomerization of α-pinene at comparatively low temperatures results in the production of dipentene and terpinene with no appreciable yield of allo-ocimene. At relatively high temperatures, for example, at 600–700° C., any attempted isomerization results in decomposition of the α-pinene into acetylene, isoprene, benzene, xylene, cymene, etc. Another significant fact is that where there is some production of allo-ocimene, it is almost invariably accompanied by the formation of a variable quantity of a complex mixture of hydrocarbons which have at present no value commercially.

It is an object of this invention to provide an improved method for the production of acyclic terpenes having three double bonds per molecule from pinene.

It is a further object to bring about the isomerization of pinene more efficiently and in higher yield than heretofore possible.

It is an object to provide a method for the production of acyclic terpenes having three double bonds per molecule from pinene whereby all the products of the pinene isomerization have commercial utility and are free from complex unidentifiable materials which have no value commercially.

A further object is to provide an improved method for the production of allo-ocimene.

A still further object is to provide a method for the production of allo-ocimene from α-pinene whereby the products of the alpha-pinene isomerization are substantially entirely allo-ocimene, dipentene and α-pinene.

Still further objects will appear hereinafter.

These objects are achieved according to this invention by passing vaporized pinene at a suitable velocity through an unfilled tube heated to a suitable temperature. Either α-pinene or β-pinene may be employed and as a result of the pyrolysis will be converted to an acyclic terpene having three double bonds per molecule. When α-pinene is employed, the acyclic terpene produced is allo-ocimene; and when β-pinene is employed, the acyclic terpene produced is myrcene. Hereinafter in this specification α-pinene will be considered specifically for purposes of illustration. However, it will be realized that the processes are equally applicable to the production of myrcene from β-pinene.

Thus, it has been found that when vaporized α-pinene is passed through an unfilled tube at a temperature of from about 300° C. to about 550° C., and preferably between about 340° C. and about 465° C., substantial quantities of allo-ocimene are formed without the aid of any catalyst.

It has further been found that, when an unfilled tube is used to convert α-pinene to allo-ocimene, there is a particular time of contact which will give a maximum yield of product for each temperature of isomerization within the ranges disclosed above. Precisely, it has been found that to obtain the maximum yield of allo-ocimene the time of contact for any particular temperature is given by the equation:

$$\theta = e^{-\frac{(t-410)}{20.4}}$$

Where $t$ = pyrolysis temperature in °C.
$\theta$ = time of contact in seconds
$e$ = 2.71828

In accordance with this relationship, when a temperature within the preferred range of 340° C. to 465° C. is employed, the time of contact of the α-pinene vapor with the reaction tube required to give maximum yield of allo-ocimene will be found to be within the range of 30.0 and 0.08 seconds. The particular time of contact will be dependent upon the particular temperature employed. By employing these preferred conditions, yields of allo-ocimene are obtained which show a considerable increase over the prior art.

Under conditions of maximum yield of allo-ocimene, there is practically no α-pinene in the resulting product. If, starting from conditions of maximum yield, the time of contact is held constant and the temperature lowered, the resulting product contains α-pinene and less than maximum allo-ocimene; at higher temperatures the allo-ocimene concentration is less than at the optimum temperature. Also, if, starting from conditions of maximum yield, the temperature is held constant and the time of contact is shortened, the product contains α-pinene with a less than maximum yield of allo-ocimene; with longer contact time the allo-ocimene concentration is less than at the contact time for maximum yield.

It has been found, in addition, that to obtain the maximum yield of allo-ocimene consistent with the requirements that the products be α-pinene and dipentene in addition to the allo-ocimene, it is desirable to use a temperature within the range of from about 300° C. to about 550° C., and preferably within the range of from about 340° C. to about 420° C., where the time of contact is given by:

$$\theta = e^{-\frac{(t-383.8)}{16.2}}$$

Where
$t$ = pyrolysis temperature in °C.
$\theta$ = time of contact in seconds
$e$ = 2.71828

My results show that when the aforesaid conditions are employed, the products are mainly confined to allo-ocimene, dipentene and α-pinene, while at conditions of maximum yield about 20–25% by weight of a mixture of unidentified terpenes is formed. Operating under conditions to give lower yield is sometimes preferable, because the by-products are all known and have a known market.

As hereinbefore stated, either α-pinene or β-pinene may be used as the starting material in accordance with this invention. The use of the former results in the production of allo-ocimene, whereas the latter yields myrcene. Now, in addition to the relatively pure starting materials, there may be employed any α-pinene or β-pinene containing material. Hence, wood and gum turpentine may be employed. It should be understood, therefore, that wherever α-pinene or β-pinene is mentioned in this specification as the starting material, it is not meant to preclude the use of any material containing α-pinene or β-pinene.

In carrying out the processes embodying this invention, α-pinene is fed into a vaporizer, from which the α-pinene vapor is passed through a pre-heater. There is no limitation as to the construction of the pre-heater, with the exception that the total volume of the pre-heater tube should be small as compared with the volume of the pyrolysis tube, such that the contact time of the α-pinene vapor in the former will be short compared with that in the latter. Otherwise there would be appreciable isomerization of the vaporized material before it reaches the pyrolysis tube. The temperature of the pre-heater may be desirably controlled such that the temperature of the vapor at the exit is that which is to be maintained in the pyrolysis tube.

From the pre-heater the vapor passes to an unfilled pyrolysis tube maintained at a suitable temperature as hereinbefore described. In general, there is no limitation as to the composition of this tube with the exception that it must be non-reactive with material used in or resulting from the pyrolysis. The dimensions of the tube will depend on the capacity of production desired and upon the particular time of contact involved. It will be realized that the diameter of the tube used should be preferably small as compared with its length in order to assure good heat transfer to the gases within. The temperature within the tube should, also, be maintained uniform throughout. To obtain such a condition, the tube may, for example, be enclosed in a heated jacket.

The vapor from the pyrolysis tube is then condensed and the condensate separated into its various components in any desirable manner. Desirably, this should be done by reduced pressure distillation. The use of reduced pressure is necessary to prevent discoloration of the product, polymerization of the constituents, and isomerization of the allo-ocimene, caused by prolonged exposure at high temperatures.

In carrying out the processes as described herein, the pressures used are not critical. The processes have been conducted under vacuum conditions without adversely affecting the results. Also, various gases, such as, steam, nitrogen, carbon dioxide, etc., which are inert to the reactants and products, may advantageously be used as diluents for the α-pinene.

In order to illustrate more fully the processes of the present invention, the following examples are given. In the examples and in the specification all parts and percentages are by weight unless otherwise specified.

EXAMPLE 1

Liquid α-pinene was fed at the rate of 28 cc. per minute to a vaporizer and was vaporized as fast as it entered. The vapor was then passed through a pre-heater. This pre-heater consisted of a brass pipe 13″ long with a $\frac{5}{16}$″ bore which was heated so that the temperature of the α-pinene vapor at the end of the tube was 405° C., the temperature at which the pyrolysis was to be carried out. From the pre-heater the vapor was fed into an unfilled, iron pyrolysis tube, having a volume of 435 cc. The temperature within the tube was maintained constant at 405° C. by enclosing the tube within a heated air jacket. Under these conditions a contact time of 2.5 seconds was maintained. The vapor from the pyrolysis tube was then condensed and a sample of the product distilled in a packed column under a pressure of 50 mm. of mercury. Distillation results showed the product consisted of no α-pinene, 37% dipentene, and 42% allo-ocimene, the remainder being a complex mixture of unidentified hydrocarbons.

EXAMPLE 2

Using the same apparatus as in Example 1 with the exception that the volume of the pre-heater tube was 16.4 cc. and the volume of the pyrolysis tube 52 cc., liquid α-pinene was fed at the rate of 100 cc. per minute to the vaporizer. The resulting contact time was 0.08 second. The temperature was held constant at from 460° C. to 465° C. The resulting vapor was condensed, and the allo-ocimene obtained was 43.5% by weight based on the α-pinene used.

Five additional runs were carried out at conditions of maximum yield of allo-ocimene, using the same apparatus as in Example 1. The results of the same, together with other pertinent data, are compared with the results obtained in Examples 1 and 2 above in the following table:

Table 1

| | Rate of Flow of α-Pinene | Parolysis Temperature | Contact Time | Yield | | | |
|---|---|---|---|---|---|---|---|
| | | | | Allo-Ocimene | Dipentene | α-Pinene | Unidentified |
| | Cc./min. | °C. | Seconds | Per cent | Per cent | Per cent | Per cent |
| Ex. 1 | 28 | 405 | .23 | 42.0 | 37.0 | nil | 21.0 |
| Ex. 2 | 100 | 460–465 | .08 | 43.5 | | nil | |
| Ex. 3 | 100 | 415–420 | 0.7 | 41.0 | | nil | |
| Ex. 4 | 100 | 415 | 0.7 | 37.0 | 33.0 | 5.0 | 25.0 |
| Ex. 5 | 40 | 401 | 1.75 | 37.5 | | nil | |
| Ex. 6 | 10 | 375 | 7.0 | 38.5 | | nil | |
| Ex. 7 | 5 | 355 | 14.0 | 38.0 | | nil | |

Three additional runs were carried out under conditions which favor the production of only allo-ocimene, α-pinene and dipentene in the product with no appreciable quantities of the complex hydrocarbon mixture referred to previously. The results of the same are shown in the following table:

Table 2

| | Rate of Flow of α-Pinene | Parolysis Temperature | Contact Time | Yield | | | |
|---|---|---|---|---|---|---|---|
| | | | | Allo-Ocimene | Dipentene | α-Pinene | Unidentified |
| | Cc./min. | °C. | Seconds | Per cent | Per cent | Per cent | |
| Ex. 1 | 100 | 391 | 0.7 | 25.0 | | | nil |
| Ex. 2 | 40 | 376 | 1.75 | 25.0 | | | nil |
| Ex. 3 | 10 | 350 | 7.0 | 28.0 | 32.0 | 40.0 | nil |

It should be understood that when the term "time of contact" is used in the specification and claims attached hereto, it is meant the time in seconds that the vaporized α-pinene remains within the reaction tube. Otherwise stated, it is the time required for a volume of vapor equal to the reaction tube volume to pass through the reaction tube. This can be evaluated in any particular instance by dividing the tube volume by the volume of α-pinene vapor passing through the tube per second.

By the use of the processes embodying this invention there is obtained a greatly increased yield of acyclic terpene over the prior art. For example, it has heretofore been possible to obtain only very small quantities of allo-ocimene from the attempted isomerization of α-pinene. It is now possible to obtain yields as high as 43.5%. Thus, there has been found a method for the production of this highly interesting material which has great commercial feasibility. Furthermore, better temperature control in the reaction tube has resulted. The use of an empty tube also obviates clogging which is always a problem where a packed tube such as has been previously used is required. As a result of the aforementioned advantage, the employment of the processes of this invention promotes an efficiency of construction and operation.

It will be understood that the details and examples given hereinbefore set forth are illustrative only and are in no way limiting on the invention as broadly described hereinbefore and in the appended claims.

This application is a continuation-in-part of my application for United States Letters Patent, Serial No. 368,364, filed December 3, 1940, now abandoned.

What I claim and desire to protect by Letters Patent is:

1. A method for the production of allo-ocimene which comprises the step of passing α-pinene through an unfilled tube at a temperature within the range of from about 340° C. to about 465° C. utilizing a time of contact within the range of from about 30 seconds to about 0.08 second.

2. A method for the production of allo-ocimene which comprises the step of passing α-pinene through an unfilled tube at a temperature within the range of from about 340° C. to about 465° C., utilizing a time of contact as given by:

$$\theta = e^{-\frac{(t-410)}{20.4}}$$

Where $t$ = pyrolysis temperature in °C.
$\theta$ = time of contact in seconds
$e$ = 2.71828

3. A method for the production of allo-ocimene which comprises the step of passing α-pinene through an unfilled tube at a temperature within the range of from about 460° C. to about 465° C., utilizing a time of contact of 0.08 second.

4. A method for the production of allo-ocimene which comprises the step of passing α-pinene through an unfilled tube at a temperature within the range of from about 340° C. to about 465° C., utilizing a time of contact as given by:

$$\theta = e^{-\frac{(t-383.8)}{16.2}}$$

Where
$t$ = pyrolysis temperature in °C.
$\theta$ = time of contact in seconds
$e$ = 2.71828

5. A method for the production of allo-ocimene which comprises the step of passing α-pinene through an unfilled tube at a temperature within the range of from about 340° C. to about 420° C., utilizing a time of contact as given by:

$$\theta = e^{-\frac{(t-383.8)}{16.2}}$$

$t$ = pyrolysis temperature in °C.
$\theta$ = time of contact in seconds
$e$ = 2.71828

6. A method for the production of allo-ocimene which comprises the step of passing α-pinene through an unfilled tube at a temperature of about 350° C., utilizing a time of contact of about 7.0 seconds.

7. A method for treating a pinene containing material which comprises passing said pinene containing material through an unfilled tube at a temperature of about 346.5° to 387.6° C., utilizing a time of contact of about 3 to 10 seconds.

8. A method for treating a pinene-containing material which comprises passing said pinene-containing material through an unfilled tube at a temperature of about 340° to 465° C. utilizing a time of contact within the range of from about 30 seconds to 0.08 second.

9. A method for the production of allo-ocimene which comprises passing alpha-pinene in the vapor state through an unfilled tube at a temperature within the range of from about 340° to about 465° C. utilizing a time of contact within the range of from about 30 seconds to about 0.08 second, thence cooling and condensing the resulting vapor and collecting the fluid condensate.

10. A method for treating gum turpentine which comprises passing said gum turpentine through an unfilled tube at a temperature of about 340° to 465° C. utilizing a time of contact of about 0.08 to 30 seconds.

ALFRED L. RUMMELSBURG.

REFERENCES CITED

The following references are of record in the file of this patent:

UNITED STATES PATENTS

| Number | Name | Date |
|---|---|---|
| 1,022,338 | Silberrad | Apr. 2, 1912 |
| 1,057,680 | Stephan | Apr. 1, 1913 |
| 1,095,395 | Heinemann | May 5, 1914 |
| 1,159,380 | Heinemann | Nov. 9, 1915 |
| 2,190,369 | Rice | Feb. 13, 1940 |
| 2,420,131 | Goldblatt et al. | May 6, 1947 |

OTHER REFERENCES

Charleton, Jour. Ind. Eng. Chem., vol. 29, 92–95 (1937).

DuPont et al., Bull. Soc. Chim. de France, Series 5, vol. 5, 322–6 (1938).

Arbusow (A), Berichte, vol. 67B 563–9 (1934).

Arbusow (B), Chem. Abs., vol. 30, 4843 (1936).

Arbusow (C), Chem. Abs., vol. 28, 2345 (1934).